(12) United States Patent
Wittig

(10) Patent No.: US 10,503,138 B2
(45) Date of Patent: Dec. 10, 2019

(54) METER UNIT AND CONTROL SYSTEM WITH METER UNIT

(71) Applicant: Phoenix Contact GmbH & Co. KG, Blomberg (DE)

(72) Inventor: Bernd Wittig, Paderborn-Sande (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 748 days.

(21) Appl. No.: 14/900,519

(22) PCT Filed: Jul. 2, 2014

(86) PCT No.: PCT/EP2014/064106
§ 371 (c)(1),
(2) Date: Dec. 21, 2015

(87) PCT Pub. No.: WO2015/003979
PCT Pub. Date: Jan. 15, 2015

(65) Prior Publication Data
US 2016/0154396 A1   Jun. 2, 2016

(30) Foreign Application Priority Data

Jul. 9, 2013   (DE) .................. 10 2013 011 391

(51) Int. Cl.
*G06F 17/00*   (2019.01)
*G05B 19/05*   (2006.01)
(Continued)

(52) U.S. Cl.
CPC ......... *G05B 19/05* (2013.01); *G06F 13/4072* (2013.01); *H04L 12/40* (2013.01); *G05B 2219/1131* (2013.01)

(58) Field of Classification Search
CPC ...... G06F 13/4072; G05B 19/05; H04L 12/40
(Continued)

(56) References Cited

U.S. PATENT DOCUMENTS

2008/0043826 A1   2/2008   Castro et al.
2011/0147135 A1   6/2011   Birrer et al.

FOREIGN PATENT DOCUMENTS

CN   101860358 A   10/2010
DE   4210015        10/1992
(Continued)

OTHER PUBLICATIONS

Authorized Officer Nora Lindner, International Patent Application No. PCT/EP2014/064106 "International Preliminary Report on Patentability", dated Jan. 21, 2016, Publisher: PCT, Published in: WO.

(Continued)

*Primary Examiner* — Tan N Tran
(74) *Attorney, Agent, or Firm* — Kaplan Breyer Schwarz, LLP

(57) ABSTRACT

A meter unit having at least one meter module and a bus interface module, wherein the meter unit is in the form of hardware and the bus interface module can be used to couple the meter unit to a bus system, as a result of which input data for the meter module can be received from a bus system and result data from the meter module can be output onto the bus system. In addition, a control system having such a meter unit is provided, also comprising a control device and a bus system, wherein the meter unit and the control device are connected to the bus system.

10 Claims, 5 Drawing Sheets

(51) Int. Cl.
*G06F 13/40* (2006.01)
*H04L 12/40* (2006.01)

(58) Field of Classification Search
USPC .......................................................... 700/90
See application file for complete search history.

(56) References Cited

FOREIGN PATENT DOCUMENTS

| | | |
|---|---|---|
| DE | 9218421 U1 | 3/1994 |
| DE | 29513506 U1 | 12/1995 |
| DE | 69023319 T2 | 6/1996 |
| DE | 19649904 A1 | 10/1997 |
| DE | 10026145 A1 | 11/2000 |
| DE | 10116057 A1 | 11/2001 |
| DE | 102008019089 A1 | 3/2009 |
| DE | 102009055817 A1 | 11/2010 |
| DE | 102008064674 A1 | 12/2010 |
| WO | 8707054 A1 | 11/1987 |

OTHER PUBLICATIONS

"Office Action", issued in German parent patent application No. 10 2013 011 391.1 dated Apr. 3, 2014.
"International Search Report and Written Opinion of the International Searching Authority", issued in International Application No. PCT/EP2014/064106 dated Oct. 10, 2014; Publisher: EPO as ISA.
Office Action issued in Chinese patent application No. 2014800395447, dated Jul. 25, 2017, 19 pp.

METER UNIT AND CONTROL SYSTEM WITH METER UNIT

FIELD OF THE INVENTION

The invention relates to a meter unit and to a control system comprising such a meter unit for counting quantities, such as a number of items or events, or for determining frequencies.

BACKGROUND OF THE INVENTION

In the environment of automated controlled processes it is known to use meters for counting quantities or events and for determining frequencies. For example, FIG. 1 shows a control system known from prior art, in which meter modules in the form of software or hardware function modules are integrated in a processor system of a control device intended for process control, such as a programmable logic controller (PLC), or are directly connected to this processor system. The processor system executes software in the form of firmware and application software, which includes at least one control program. Via an internal bus in the form of a process data bus and a bus interface unit of the control device, the processor system is connected to an external bus, such as a field bus in the form of a remote bus or local bus, to which further bus subscriber units are connected, for example input or output modules. A drawback of this solution is that input data with information for a meter module originating from a bus subscriber unit and, in the reverse direction, result data from a meter module with information for a bus subscriber unit are always routed via the processor system, and that the meter modules are dependent on the processor system. On the one hand, this puts a load on the processor system, since the executed software and in particular the application software includes corresponding program steps for querying, processing and forwarding the input data and result data, which program steps must always be executed by the processor system. On the other hand, the processor system that is always involved and the software that has to be executed by the latter may have an adverse effect on latency and jitter performance of the metering function, so that fast and accurate metering of quantities or events or determining of frequencies is not possible in reliable manner, especially in the case where data are provided at high data rates and/or high data volumes.

Furthermore, a high speed meter device is known from DE 42 10 015 C2, wherein a meter module implemented in hardware is disposed remote from a programmable control device and is connected thereto via a serial remote I/O line. Via a separate line, the meter module is able to receive a signal from a rotary encoder or a sensor. The meter module is operated under the control of a microprocessor. However, a drawback here is that the meter module has to be arranged remote from the control device and in the vicinity of the respective rotary encoder or sensor, from which it then receives its input signal via a separate line. Especially in large industrial installations which require a plurality of meter modules, this causes a spatial distribution of the meter modules and requires many separate connection lines and therefore results in increased installation and maintenance complexity.

SUMMARY OF THE INVENTION

Therefore, an object of the invention is to provide a fast and accurate metering function having little installation and maintenance complexity.

This object is achieved by a meter unit and a control system in accordance with the illustrative embodiment of the present invention.

The meter unit according to the invention comprises at least one meter module and a bus interface module and is characterized in that the meter unit is implemented in hardware and that the bus interface module enables the meter unit to be coupled to a bus system so that input data for the meter module can be received from a bus system and result data from the meter module can be output onto the bus system.

The meter unit according to the invention offers many advantages. For example, the meter unit itself can be coupled to a bus system, and a metering function can thus be provided independently from a processor system of a control device. Input data are directly available for the meter module, without detour via the processor system, and result data from the meter module can directly be output onto the bus system, without detour via the processor system. The processor system of the control device can be relieved of the metering function, since the latter can be transferred to the meter unit. This is particularly advantageous if the data throughput otherwise to be managed by the processor system would be very high, due to a metering function for data with high data rates and/or high data volumes. By transferring the metering function to the meter unit, capacity of the processor system is free for other functions, or a cheaper processor system with lower performance may now be used to provide only the remaining control functions. Moreover, since the meter unit is implemented in hardware, it can perform the metering function more rapidly than a processor system that implements the metering function by software. Software-related delays are eliminated, that is, latency and jitter performance of the metering function provided by the meter unit will now meet higher requirements and permit fast and accurate metering of quantities or events or determining of frequencies in reliable manner, even if data are provided at high data rates and/or high data volumes.

According to a preferred embodiment, the meter unit comprises an evaluation and assignment module which is connected to the bus interface module and to the meter module, wherein the evaluation and assignment module is adapted to mask and analyze input data for the meter module from a data stream transmitted in a bus system, and to assign and forward them to the meter module. The input data extracted from the data stream may include control bits and/or status bits, for example. Advantageously, therefore, the relevant input data that contain or represent information to be metered, can be extracted from the data stream by the meter unit.

According to a further preferred embodiment, the meter unit comprises at least one further meter module and a switching module, wherein the switching module is connected between the evaluation and assignment module and the meter modules. In this case, the switching module is in particular configured as a demultiplexer for input data for the meter modules and as a multiplexer for the result data from the meter modules. For example, on one side the switching module has one connection channel for the evaluation and assignment module, and on the other side it has a plurality of connection channels, with a respective meter module connected to each of this connection channels. Advantageously, therefore, a plurality of meter modules can be provided within the single meter unit with functional connectivity so that a plurality of metering functions can be provided independently.

According to a further preferred embodiment, the meter unit comprises at least one control module that is connected to the evaluation and assignment module and in particular also to the switching module, and the control module is adapted to control the operation of the meter unit and in particular to control the evaluation and assignment module and/or the switching module.

According to a further preferred embodiment, the meter unit comprises a register module adapted to store at least one parameter, wherein the parameter in particular comprises assignment information, a limit value, or a threshold value. In this case, the register module is connected to the control module, and the control module is adapted to control the operation of the meter unit taking into account the parameter stored in the register module. This offers the advantage that the meter unit and the operation thereof can be parameterized and is therefore easily adaptable.

The control system according to the invention comprises, in addition to a meter unit according to the invention, a control device and a bus system, wherein the meter unit and the control device are connected to the bus system. Thus, the control system also offers the advantages already mentioned.

According to a preferred embodiment, the control device of the control system comprises a processor system and a bus interface unit, and the bus system comprises an internal bus which connects the processor system and the bus interface unit with each other. In this case, the internal bus is preferably configured as a process data bus.

According to a further preferred embodiment, the control system comprises at least one bus subscriber unit, wherein the bus system comprises an external bus which connects the bus interface unit of the control device and the bus subscriber unit with each other. In this case, the external bus is preferably configured as a field bus, for example in the form of a local bus or remote bus.

According to another preferred embodiment of the control system, the meter unit is coupled to the internal bus or to the external bus. In this case, the bus interface module is appropriately configured for the communication mechanisms and communication protocols of the respective bus. This flexibility of the meter unit in terms of options for connection to different buses is a further advantage.

According to another preferred embodiment of the control system, the meter unit receives input data for the meter module from the processor system and/or from the bus subscriber unit via the bus system. Furthermore, the meter unit outputs result data from the meter module intended for the processor system and/or for the bus subscriber unit onto the bus system. The input data for the meter module originating from the processor system may comprise outgoing process data of the processor system. The input data for the meter module originating from the bus subscriber unit may comprise incoming process data of the bus subscriber unit. Advantageously, therefore, the relevant input data that contain or represent information to be metered, may include process data originating from the processor system or from a bus subscriber unit.

According to a further preferred embodiment, the control system comprises at least one further bus subscriber unit which is also connected to the external bus. The meter unit receives input data from one bus subscriber unit via the bus system and outputs result data for the other bus subscriber unit onto the bus system. For example, the one bus subscriber unit may comprise an input module including at least one sensor. Furthermore, the other bus subscriber unit may comprise an output module including at least one actuator.

BRIEF DESCRIPTION OF THE DRAWINGS

These and other features and advantages will become more apparent from the following description of exemplary embodiments in conjunction with the accompanying drawings, wherein.

DETAILED DESCRIPTION

Figure 1:
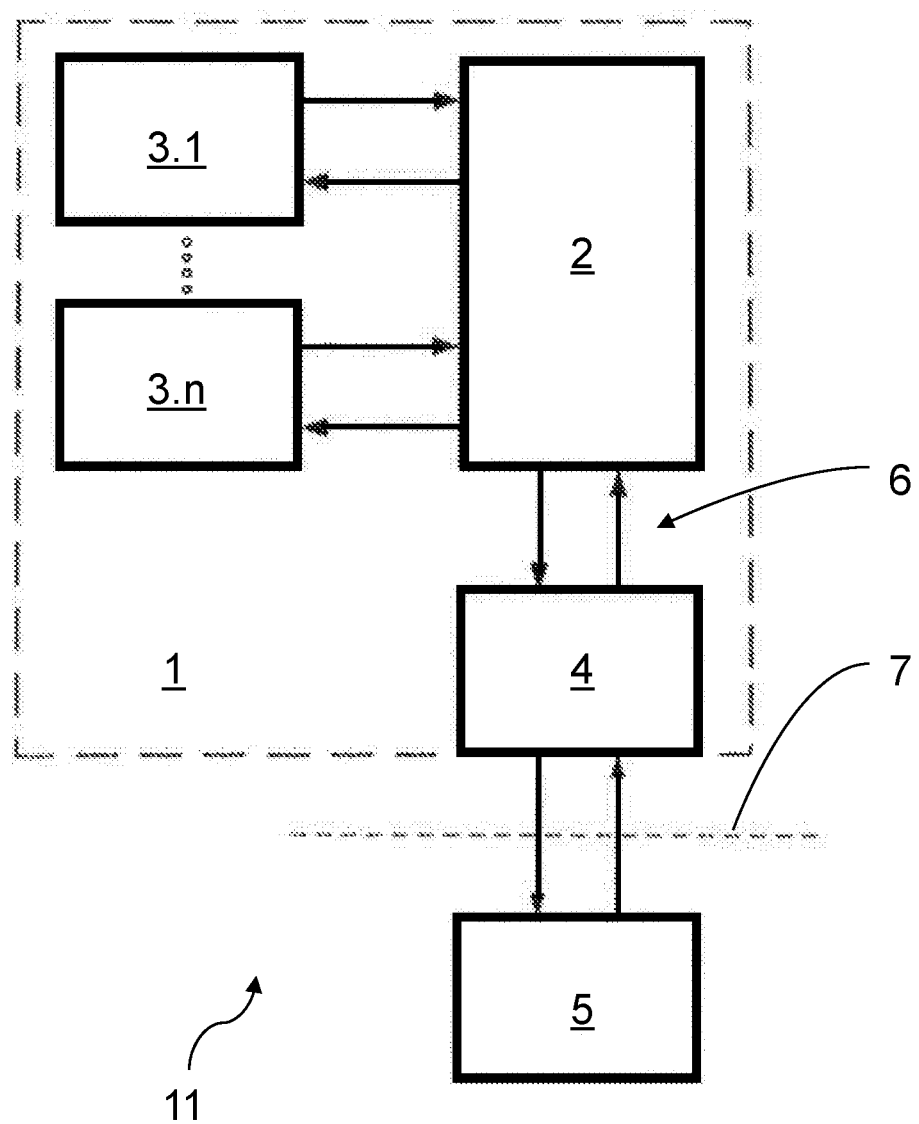
FIG. 1 is a schematic diagram of a control system according to the prior art.

FIG. 1 shows, by way of example and as already mentioned above, a control system 11 known from prior art, in which meter modules 3.1 through 3.n in form of function modules implemented in software or hardware are directly connected to a processor system 2 of a control device 1 provided for process control, such as a programmable logic controller (PLC). Alternatively, the meter modules could be integrated in the processor system as function modules. The processor system 2 executes software in the form of firmware and application software, not illustrated in detail herein, which includes at least one control program. Via an internal bus in the form of a process data bus 6 and a bus interface unit 4 of the control device 1, the processor system 2 is connected to an external bus 7, such as a field bus in the form of a remote bus or local bus, to which further bus subscriber units 5 are connected, such as input or output modules, only one of which is shown here. The drawbacks of this solution have already been mentioned above. The main problem here is that input data with information for a meter module 3.1 or 3.n originating from a bus subscriber unit 5 and, in the reverse direction, result data from a meter module with information for a bus subscriber unit 5 are always routed via processor system 2 and the software executed therein.

In contrast to FIG. 1, FIGS. 2 to 5 illustrate three embodiments of a control system 11 with a meter unit 30 according to the invention, in which the meter unit 30 is implemented in hardware, comprising at least one meter module and a bus interface module, and can be coupled or is already coupled to a bus system via the bus interface module, so that input data for the meter module can be received from the bus system and result data from the meter module can be output onto the bus system. For the sake of simplicity and better comprehensibility, components having similar properties or functionalities are designated with the same reference numerals in the figures. Existing differences, if any, will be apparent from the description above and below.

Figure 2:
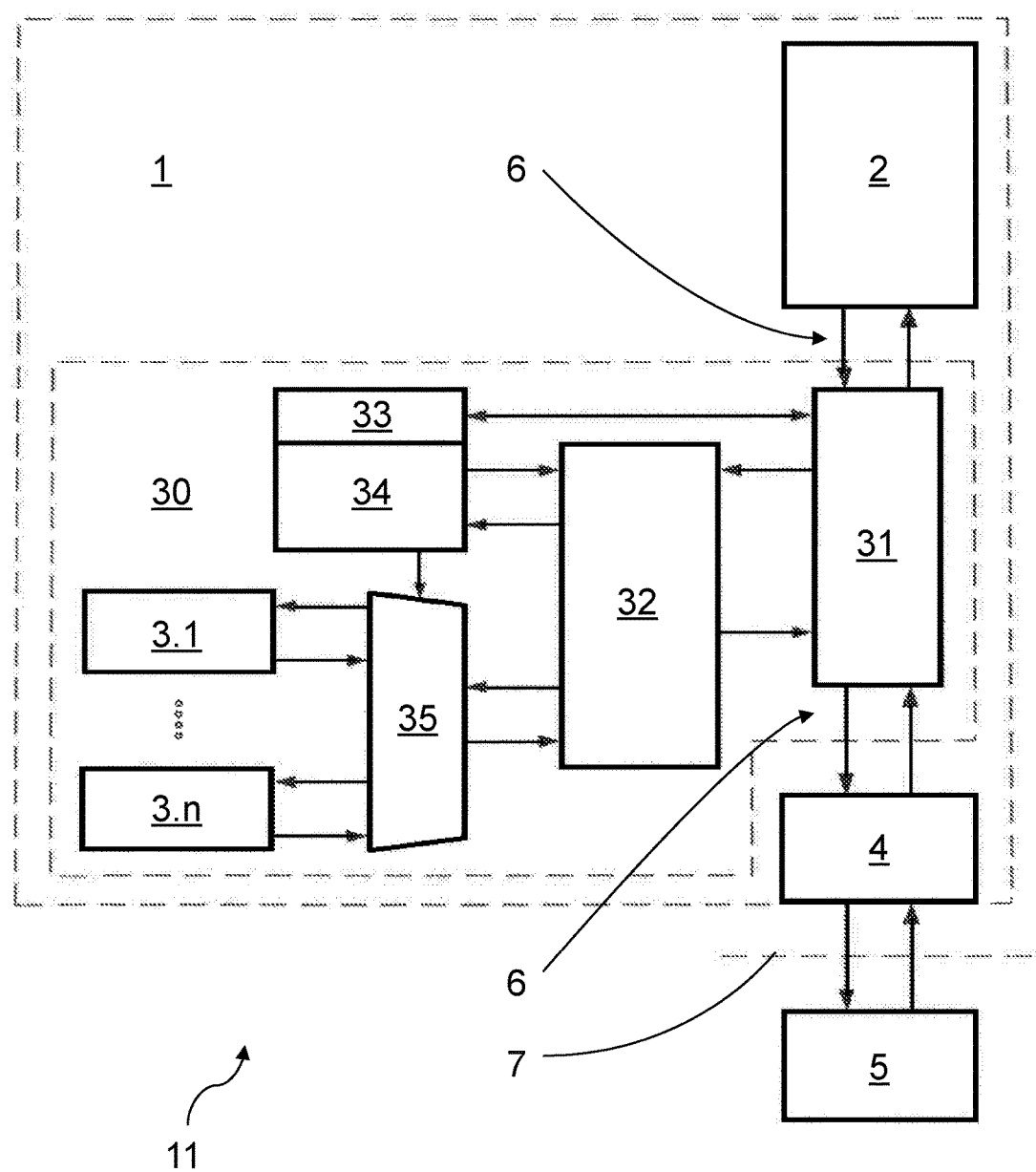
FIG. 2 is a schematic diagram of a control system including a meter unit according to one embodiment of the invention.
Figure 3:
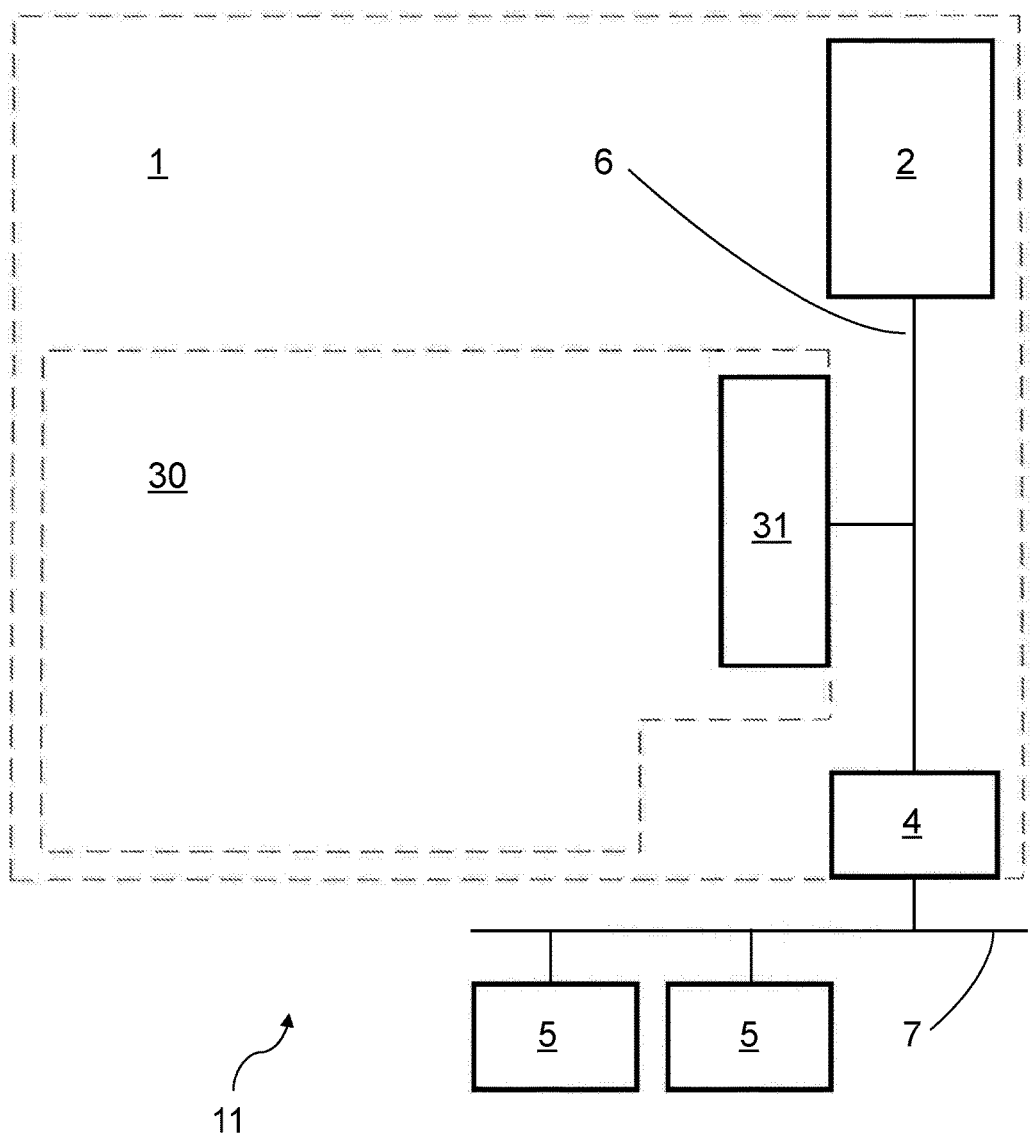
FIG. 3 is an alternative representation of the control system of FIG. 2.

FIGS. 2 and 3 show a first exemplary embodiment of a control system 11 with a meter unit 30 according to the present invention.

Besides a meter unit 30 according to the invention, this control system 11 comprises a control device 1 comprising a processor system 2 and a bus interface unit 4 which are connected with each other via an internal bus 6 of control device 1, which is configured as a process data bus. Meter unit 30 is likewise connected to the internal bus 6, by means of its bus interface module 31. Bus interface module 31 is appropriately configured for the communication mechanisms and communication protocols of internal bus 6.

Control system 11 further comprises two bus subscriber units 5, only one of which is shown in FIG. 2, while FIG. 3 shows both of them. An external bus 7 of control system 11, which is configured as a field bus in the form of a local bus herein, connects the bus interface unit 4 of control device 1 and the two bus subscriber units 5 with each other. One of bus subscriber units 5 comprises an input module with at least one sensor, not illustrated in more detail here, while the other bus subscriber unit 5 comprises an output module with at least one actuator, not illustrated in more detail here.

The bus system comprising external bus 7 and internal bus 6 is adapted, for example, to transfer process data and in particular process input data and process output data in form of a data stream between bus subscriber units 5 and the processor system 2 of control device 1 and vice versa, for controlling a process of an industrial installation.

Meter unit 30 is implemented in hardware, and in a preferred embodiment it comprises, in addition to the interface module 31, a plurality of meter modules, of which meter modules 3.1 and 3.$n$ are shown herein. Meter unit 30 further comprises an evaluation and assignment module 32 which is connected to bus interface module 31. A switching module 35 of meter unit 30 is connected between evaluation and assignment module 32 and meter modules 3.1, 3.$n$.

Via the bus interface module 31 of meter unit 30, input data for meter module 3.1 or 3.$n$ can be received from a bus system, and result data from the meter module 3.1 or 3.$n$ can be output onto the bus system. The evaluation and assignment module 32 is adapted to mask and evaluate input data for meter module 3.1 or 3.$n$ from a data stream transferred on internal bus 6, and to assign and forward these input data to the respective meter module. The input data extracted from the data stream may include control bits and/or status bits, for example. In this manner, the relevant input data that contain or represent information to be metered, can therefore be extracted from the data stream by the meter unit.

Switching module 35 is configured as a demultiplexer for input data for the meter modules 3.1, 3.$n$ and as a multiplexer for the result data from the meter modules 3.1, 3.$n$, having one connection channel (without reference numeral) for the evaluation and assignment module 32 on one side, and on the other side a plurality of connection channels (without reference numerals) with meter module 3.1 connected to one of these connection channels and meter module 3.$n$ connected to another one of these connection channels. Therefore, evaluation and assignment module 32 and switching module 35 enable a plurality of meter modules 3.1, 3.$n$ to provide a plurality of metering functions independently from each other within the single meter unit 30.

Meter unit 30 furthermore comprises a control module 34 which is connected to evaluation and assignment module 32 and to switching module 35, and a register module 33 connected to control module 34. Register module 33 is adapted to store at least one parameter, and control module 34 is adapted to control the operation of meter unit 30, in particular to control evaluation and assignment module 32 and switching module 35 while taking into account the parameter stored in register module 33. The at least one parameter stored in the register may comprise assignment information, a limit value, or a threshold value. The assignment information may define, for example, which input data are to be assigned and forwarded to which meter module. Thus, the meter unit 30 and the operation thereof can be parameterized, for example the switching behavior of switching module 35, and is therefore easily adaptable. This is further facilitated by the fact that the register module 33 is likewise connected to the bus interface 31, so that read and/or write access to the register module 33 is possible from a device connected to the meter unit 30 via the bus system, and such a device may be the processor system 2 or a maintenance terminal not illustrated herein, for example.

In addition to meter modules 3.1 and 3.$n$, at least one comparator module and/or at least one gate module (AND, OR), not shown herein, may be connected to the switching module.

Thus, meter unit 30 is coupled to the internal bus 6 of control device 1 via its bus interface module 31 and is therefore arranged between processor system 2 and interface unit 4 and connected to both by the internal bus 6. By virtue of interface unit 4 which couples the internal bus to the external bus 7, meter unit 30 is connected to bus subscriber units 5, like processor system 2.

From bus system 6, 7 or from a data stream transferred via the bus system, the meter unit 30 receives input data for meter modules 3.1, 3.$n$, which data are originating from system processor 2 and/or from any one of bus subscriber units 5. Further, meter unit 30 outputs result data from meter modules 3.1, 3.$n$ intended for the processor system 30 and/or for any one of bus subscriber units 5 onto the bus system 6, 7.

The input data for the meter module originating from the processor system may comprise outgoing process data or process output data of processor system 2. The input data for the meter module originating from one of the bus subscriber units may comprise incoming process data or process input data of the bus subscriber unit.

Advantageously, therefore, the relevant input data that contain or represent information to be metered, may include process data originating from the processor system or from a bus subscriber unit.

The reception of input data for the meter modules by the meter unit may, for example, be accomplished by reading the data stream transferred via the bus system and the process data contained therein. Within the data stream, different data areas may be provided which are reserved for the data of specified bus subscribers or the processor system. In this case, the data read by the meter unit will be analyzed according to a predefined mask and will be processed as input data for the meter modules. Furthermore, data areas may be provided in the data stream which are reserved for the result data from the meter modules. In this case, the result data will be written into the respective data areas of the data stream according to the predefined mask and will be transmitted in this manner. The result data from the meter modules are available as process data to the other bus subscribers and to the processor system.

Thus, the meter unit 30 itself can be coupled to a bus system, and therefore a metering function can be provided independently of the processor system 2 of control device 1. Input data are directly available to meter modules 3.1, 3.$n$ without detour via the processor system, and result data of the meter modules can be directly output to the bus system 6, 7 without detour via the processor system.

Except for bus interface module 31, the other modules 32, 33, 34, 35, 3.1, and 3.n of meter unit 30 that have already been described and illustrated in FIG. 2 are, although present, not shown again in FIG. 3, for the sake of simplicity.

Figure 4:
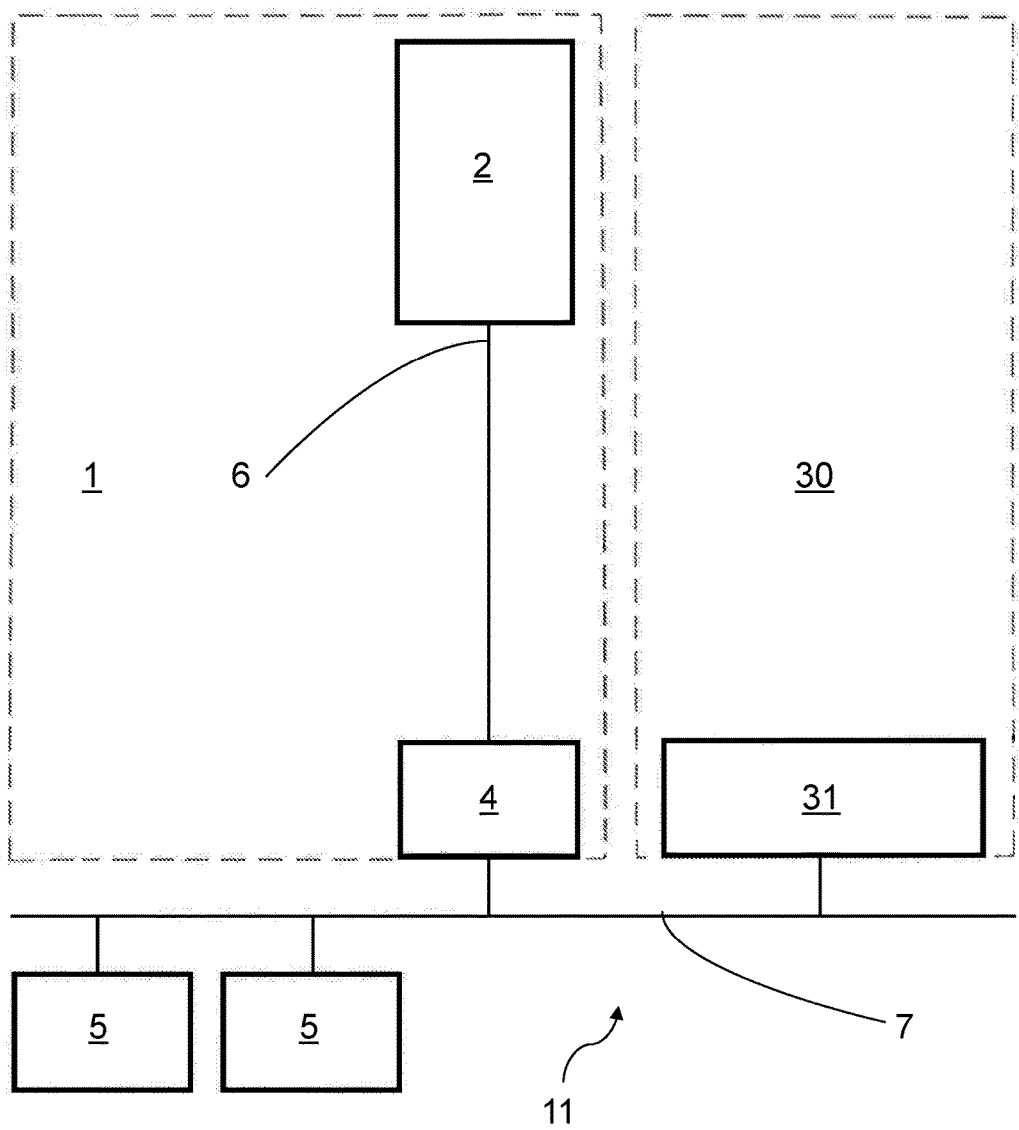
FIG. 4 is a schematic diagram of a control system including a meter unit according to another embodiment of the invention.

FIG. 4 shows a second exemplary embodiment of a control system 11 with a meter unit 30 according to the present invention.

In contrast to the first embodiment of FIGS. 2 and 3, the control system 11 of FIG. 4 comprises a meter unit 30 that is not coupled to the internal bus 6 of control device 1 but to the external bus 7, by means of its bus interface module 31. In this case, bus interface module 31 is appropriately configured for the communication mechanisms and protocols of external bus 7 and in particular functions like a bus interface unit 4 according to FIGS. 2 and 3.

Thus, meter unit 30 is not comprised in control device 1, but rather itself is coupled to the external bus 7, like control device 1, and is connected to the bus subscriber units 5 via external bus 7. By virtue of the interface unit 4 of control device 1, which couples the internal bus 6 of control device 1 to the external bus 7, meter unit 30 is additionally connected to the processor system 2 of control device 1.

In this embodiment, again, meter unit 30 receives input data for meter modules 3.1, 3.n originating from processor system 2 and/or from any one of bus subscriber units 5 via the bus system 6, 7 or from a data stream transferred on the bus system. Furthermore, meter unit 30 outputs result data from meter modules 3.1, 3.n for processor system 30 and/or for any one of bus subscriber units 5 onto the bus system 6, 7.

Except for bus interface module 31, the other modules 32, 33, 34, 35, 3.1, and 3.n of meter unit 30 that have already been described and illustrated in FIG. 2 are, although present, not shown again in FIG. 4, for the sake of simplicity.

Figure 5:
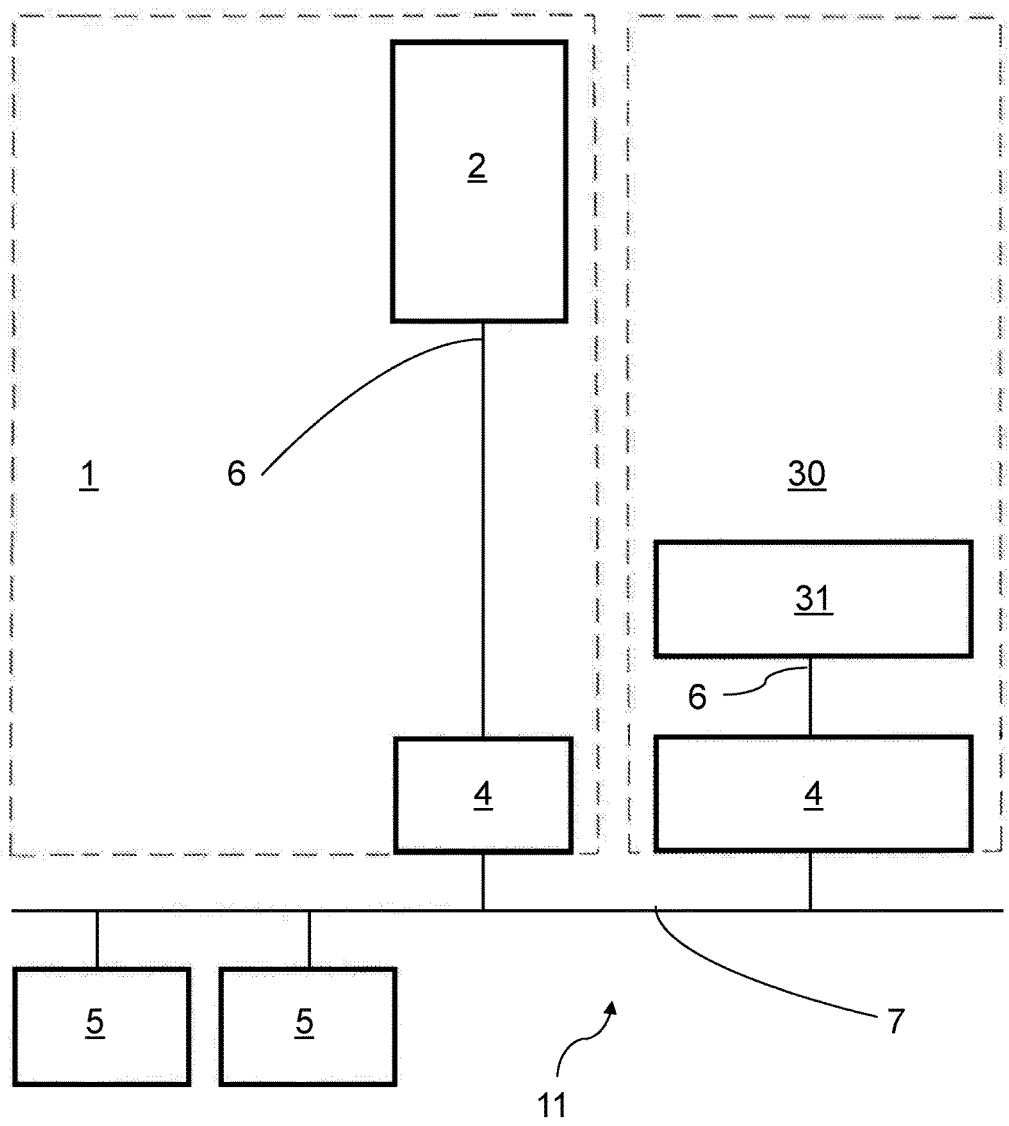
FIG. 5 is a schematic diagram of a control system including a meter unit according to yet another embodiment of the invention.

FIG. 5 shows a third exemplary embodiment of a control system 11 with a meter unit 30 according to the present invention.

In contrast to the second embodiment according to FIG. 4, this control system 11 of FIG. 5 comprises a meter unit 30 which includes a bus interface module 31 and a bus interface unit 4. Bus interface unit 4 connects the meter unit 30 to the external bus 7. Bus interface module 31 and bus interface unit 4 are connected to each other by an internal bus 6. Therefore, bus interface module 31 is appropriately configured for the communication mechanisms and communication protocols of the internal bus 6 of meter unit 30.

According to this third embodiment, meter unit 30 is again not comprised in control device 1, but rather itself is coupled to the external bus 7, like control device 1, and is also connected to the bus subscriber units 5 via external bus 7. By virtue of the interface unit 4 of control device 1, which couples the internal bus 6 of control device 1 to the external bus 7, meter unit 30 is moreover connected to the processor system 2 of control device 1.

In this embodiment, again, meter unit 30 receives input data for meter modules 3.1, 3.n originating from processor system 2 and/or from any one of bus subscriber units 5 via the bus system 6, 7 or from a data stream transferred via the bus system. Furthermore, meter unit 30 outputs result data from meter modules 3.1, 3.n for the processor system 30 and/or for any one of bus subscriber units 5 onto the bus system 6, 7.

Except for bus interface unit 4 and bus interface module 31, the other modules 32, 33, 34, 35, 3.1, and 3.n of meter unit 30 that have already been described and illustrated in FIG. 2 are, although present, not shown again in FIG. 5, for the sake of simplicity.

Thus, meter unit 30 can be coupled to different buses or data networks, depending on the embodiment.

LIST OF REFERENCE NUMERALS

1 Control device
2 Processor system
3.1 Meter module
3.n Further meter module
4 Bus interface unit
5 Bus subscriber, input module, output module
6 Internal bus, process data bus
7 External bus, fieldbus, remote bus, local bus
11 Control system
30 Meter unit
31 Bus interface module
32 Evaluation and assignment module
33 Register module
34 Control module
35 Switching module

What is claimed is:

1. A meter unit, comprising at least one meter module, a bus interface module, and an evaluation and assignment module connected to the bus interface module and to the meter module;
    wherein the meter unit is implemented in hardware; and
    wherein the bus interface module enables:
        the meter unit to be coupled to a bus system so that:
            input data for the meter module is received from the bus system, with the evaluation and assignment module being adapted to mask, to extract, and to evaluate the input data for the meter module from a data stream transferred on the bus system, and to assign and forward them to the meter module, and
            result data from the meter module is output onto the bus system.

2. The meter unit as claimed in 1, further comprising:
    at least one further meter module and a switching module;
    wherein the switching module is connected between the evaluation and assignment module and the meter modules; and
    wherein the switching module is in particular configured as a demultiplexer for input data for the meter modules and as a multiplexer for the result data from the meter modules.

3. The meter unit as claimed in claim 1, further comprising:
    at least one control module which is connected to the evaluation and assignment module and in particular is also connected to the switching module;
    wherein the control module is adapted to control the operation of the meter unit and in particular to control the evaluation and assignment module and/or the switching module.

4. The meter unit as claimed in claim 3, further comprising:
    a register module adapted to store at least one parameter;
    wherein the parameter in particular comprises an assignment information, a limit value, or a threshold value; and
    wherein the register module is connected to the control module; and
    the control module is adapted to control the operation of the meter unit taking into account the parameter stored in the register module.

5. A control system comprising a meter unit as claimed in claim 1, further comprising a control device;

wherein the meter unit and the control device are connected to the bus system.

6. The control system as claimed in claim 5, wherein the control device comprises a processor system and a bus interface unit; and wherein the bus system comprises an internal bus which connects the processor system and the bus interface unit with each other.

7. The control system as claimed in claim 6, further comprising at least one bus subscriber unit, wherein the bus system comprises an external bus, which connects the bus interface unit of the control device and the bus subscriber unit with each other.

8. The control system as claimed in claim 6, wherein the meter unit is coupled to the internal bus.

9. The control system as claimed in claim 8, wherein the meter unit receives input data for the meter module from the processor system and/or from the bus subscriber unit via the bus system; and wherein the meter unit outputs result data from the meter module for the processor system and/or for the bus subscriber unit onto the bus system.

10. The control system as claimed in claim 8, further comprising at least one further bus subscriber unit which is also connected to the external bus; wherein the meter unit receives input data from one bus subscriber unit via the bus system, and wherein the meter unit outputs result data for the other bus subscriber unit onto the bus system.

* * * * *